(12) United States Patent
Kurino

(10) Patent No.: US 12,554,068 B2
(45) Date of Patent: Feb. 17, 2026

(54) OPTICAL FIBER HOLDER AND METHOD FOR CONNECTING COATED OPTICAL FIBERS

(71) Applicant: SUMITOMO ELECTRIC OPTIFRONTIER CO., LTD., Kanagawa (JP)

(72) Inventor: Shinsuke Kurino, Yokohama (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 245 days.

(21) Appl. No.: 18/549,260

(22) PCT Filed: Mar. 9, 2022

(86) PCT No.: PCT/JP2022/010377
§ 371 (c)(1),
(2) Date: Sep. 6, 2023

(87) PCT Pub. No.: WO2022/191249
PCT Pub. Date: Sep. 15, 2022

(65) Prior Publication Data
US 2024/0151905 A1 May 9, 2024

(30) Foreign Application Priority Data
Mar. 10, 2021 (JP) .................. 2021-038628

(51) Int. Cl.
G02B 6/25 (2006.01)
G02B 6/255 (2006.01)

(52) U.S. Cl.
CPC ......... *G02B 6/2556* (2013.01); *G02B 6/2553* (2013.01)

(58) Field of Classification Search
CPC ................ G02B 6/2556; G02B 6/2553
(Continued)

(56) References Cited

U.S. PATENT DOCUMENTS 10,107,964 B1 * 10/2018 Zhao ............ G02B 6/2556
2019/0235173 A1    8/2019 Sato et al.
(Continued)

FOREIGN PATENT DOCUMENTS

CN    210514686 U    5/2020
JP    2020-144327 A    9/2020
(Continued)

OTHER PUBLICATIONS

International Search Report dated Apr. 26, 2022 issued in PCT/JP2022/010377.
Written Opinion dated Apr. 26, 2022 issued in PCT/JP2022/010377.

*Primary Examiner* — Jerry M Blevins
(74) *Attorney, Agent, or Firm* — McDonald Hopkins LLC

(57) ABSTRACT

An optical fiber holder includes: a holder body including an accommodating portion, the accommodating portion being configured to accommodate a plurality of optical fibers in a state in which the plurality of optical fibers are arranged in parallel; and a first lid portion configured to be opened and closed relative to the holder body and cover at least a part of the accommodating portion. The accommodating portion includes a pitch conversion portion having a plurality of ridge portions arranged in parallel and a plurality of flat bottom portions between the plurality of ridge portions. The plurality of ridge portions have a uniform height of 0.1 mm or less from the bottom portions, and parallel intervals in between enlarge or lessen from one side toward the other side in a longitudinal direction.

4 Claims, 7 Drawing Sheets

(58) Field of Classification Search
USPC .......................................................... 385/95
See application file for complete search history.

(56) References Cited

U.S. PATENT DOCUMENTS

2021/0157059 A1    5/2021  Sato et al.
2022/0082758 A1*   3/2022  Nguyen ............... G02B 6/3898

FOREIGN PATENT DOCUMENTS

JP       2020-148834 A    9/2020
WO      2018/047513 A1    3/2018

* cited by examiner

OPTICAL FIBER HOLDER AND METHOD FOR CONNECTING COATED OPTICAL FIBERS

TECHNICAL FIELD

The present disclosure relates to an optical fiber holder and a method for connecting coated optical fibers (optical fibers).

The present application claims priority from Japanese Patent Application No. 2021-filed on Mar. 10, 2021, contents of which are incorporated by reference in its entirety.

BACKGROUND ART

For example, Patent Literatures 1 and 2 disclose an optical fiber holding member that can collectively hold a plurality of optical fibers. Patent Literatures 1 and 2 disclose an optical fiber holder that can arrange a plurality of optical fibers in parallel at an arrangement pitch different from an arrangement pitch of the plurality of optical fibers before being held by the optical fiber holder.

CITATION LIST

Patent Literature

Patent Literature 1: JP2020-144327A
Patent Literature 2: WO2018/047513

SUMMARY OF INVENTION

According to an aspect of the present disclosure, there is provided an optical fiber holder including:
a holder body including an accommodating portion, the accommodating portion being configured to accommodate a plurality of optical fibers in a state in which the plurality of optical fibers are arranged in parallel; and
a first lid portion configured to be opened and closed relative to the holder body and cover at least a part of the accommodating portion, in which
the accommodating portion includes a pitch conversion portion having a plurality of ridge portions arranged in parallel and a plurality of flat bottom portions between the plurality of ridge portions, and
the plurality of ridge portions have a uniform height of 0.1 mm or less from the bottom portions, and parallel intervals in between enlarge or lessen from one side toward the other side in a longitudinal direction.

According to an aspect of the present disclosure, there is provided a method for connecting optical fibers using the above optical fiber holder, the method including:
placing the plurality of optical fibers in the pitch conversion portion, converting pitches of the plurality of optical fibers placed in the pitch conversion portion into pitches of another device different from the optical fiber holder by the plurality of ridge portions, and accommodating the plurality of optical fibers in the accommodating portion; and
connecting the plurality of optical fibers subjected to pitch conversion to other optical fibers that are disposed in the other device and are different from the plurality of optical fibers.

DESCRIPTION OF EMBODIMENTS

Technical Problem

Figure 1:
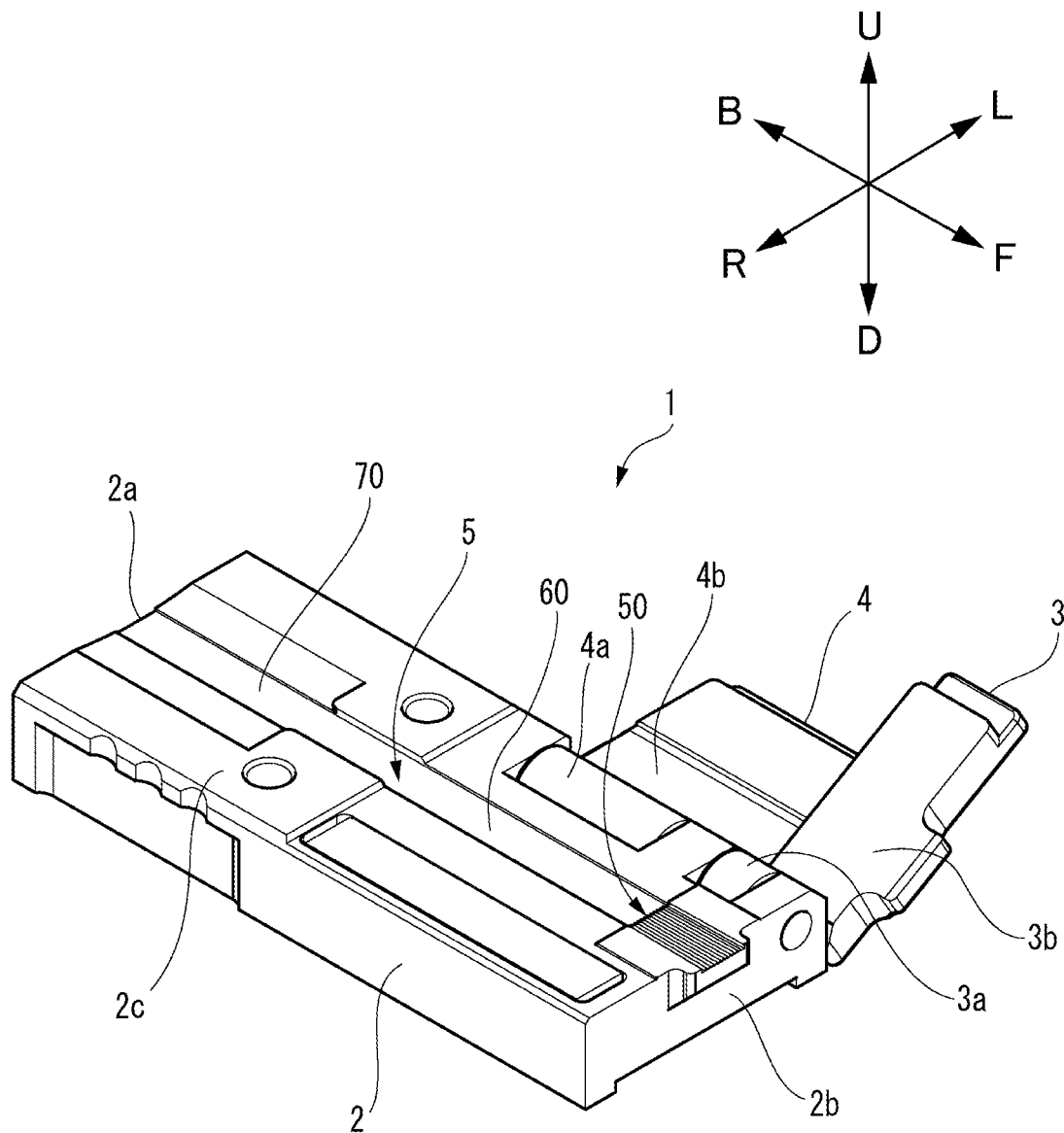
FIG. 1 is a perspective view of an optical fiber holder according to an embodiment.

Diameters of optical fibers have been reduced in recent years, and an optical fiber having an outer diameter of, for example, 0.20 mm, which is obtained by reducing a diameter of a normally used optical fiber having an outer diameter of 0.25 mm, can be manufactured. Even for an optical fiber ribbon (fiber ribbon) including a plurality of optical fibers integrated in parallel, an optical fiber ribbon in which an arrangement pitch of adjacent optical fibers is narrowed, for example, from 0.25 mm to 0.20 mm is manufactured. However, pitches of V-grooves of a fusion splicer or the like in the related art that fuses optical fiber ribbons (or a plurality of optical fibers arranged in parallel) are 0.25 mm. For this reason, when optical fiber ribbons having an arrangement pitch of 0.20 mm or optical fibers having mixed arrangement pitches are fused, positions of the optical fibers and the V-grooves are shifted, making it difficult to reliably place all the optical fibers in the V-grooves. To set the pitches of the V-grooves to be 0.20 mm, it is necessary to set the pitches of the V-grooves to be 0.20 mm by newly designing and manufacturing a fusion splicer or the like, or by modifying or replacing V-groove portions of a fusion splicer or the like in the related art, which takes time and cost.

An object of the present disclosure is to provide an optical fiber holder and a method for connecting optical fibers that can change pitches of a plurality of coated optical fibers according to pitches of a device such as a fusion splicer.

Advantageous Effects of Invention

According to the present disclosure, it is possible to provide an optical fiber holder and a method for connecting optical fibers that can change pitches of a plurality of coated optical fibers according to pitches of a device such as a fusion splicer.

DESCRIPTIONS OF EMBODIMENTS

First, embodiments of the present disclosure will be listed and described.

(1) According to an aspect of the present disclosure, there is provided an optical fiber holder including:

a holder body including an accommodating portion, the accommodating portion being configured to accommodate a plurality of optical fibers in a state in which the plurality of optical fibers are arranged in parallel; and a first lid portion configured to be opened and closed relative to the holder body and cover at least a part of the accommodating portion, wherein the accommodating portion includes a pitch conversion portion having a plurality of ridge portions arranged in parallel and a plurality of flat bottom portions between the plurality of ridge portions, and the plurality of ridge portions have a uniform height of 0.1 mm or less from the bottom portions, and parallel intervals in between enlarge or lessen from one side toward the other side in a longitudinal direction.

According to this configuration, it is possible to change pitches of a plurality of coated optical fibers in accordance with pitches of a device such as a fusion splicer by the pitch conversion portion including the flat bottom portions and the ridge portions having a relatively small height of 0.1 mm or less. Accordingly, it is not necessary to remove a coating of the optical fibers in the optical fiber holder, and thus it is not necessary to increase a coating removal length more than necessary. The optical fiber holder according to the above configuration can be applied, by the pitch conversion portion including the flat bottom portions and the ridge portions having a height of 0.1 mm or less, and the first lid portion that covers the plurality of optical fibers from above to prevent the plurality of optical fibers from floating, not only to a single-core optical fibers arranged in parallel, but also to a fiber ribbon in which all adjacent optical fibers are coupled in the longitudinal direction and a fiber ribbon with fiber adhesive parts and non-adhesive parts.

(2) In the optical fiber holder according to an aspect of the present disclosure, the pitch conversion portion may be provided at one end portion of the accommodating portion in the longitudinal direction, and the first lid portion may cover at least a part of the pitch conversion portion.

According to this configuration, it is possible to continuously change pitches of optical fibers protruding from the optical fiber holder while changing the pitches of the optical fibers at the one end portion of the optical fiber holder.

(3) According to an aspect of the present disclosure, the optical fiber holder may further include:

a second lid portion configured to be opened and closed relative to the holder body, cover a region of the accommodating portion that is different from the pitch conversion portion in a state of being closed relative to the holder body, and hold the optical fibers accommodated in the accommodating portion.

According to this configuration, since the optical fibers can be held by the second lid portion, the first lid portion does not necessarily press the optical fibers and the optical fibers are less likely to be damaged.

(4) In the optical fiber holder according to an aspect of the present disclosure, a gap from the bottom portions to the first lid portion has a height of 220 μm or more and 250 μm or less in a state in which the first lid portion is closed relative to the holder body.

According to this configuration, the first lid portion can be prevented from pressing the optical fibers sandwiched between the first lid portion and with the bottom portions. According to the optical fiber holder, the optical fibers easily move in a parallel direction on the flat bottom portions since the optical fibers are not pressed, and the pitches can be changed without applying an unnecessary external force to the optical fibers.

(5) According to an aspect of the present disclosure, there is provided a method for connecting optical fibers using the optical fiber holder described in any one of (1) to (4), the method including:

placing the plurality of optical fibers in the pitch conversion portion, converting pitches of the plurality of optical fibers placed in the pitch conversion portion into pitches of another device different from the optical fiber holder by the plurality of ridge portions, and accommodating the plurality of optical fibers in the accommodating portion; and connecting the plurality of optical fibers subjected to pitch conversion to other optical fibers that are disposed in the other device and are different from the plurality of optical fibers.

According to this configuration, it is possible to change pitches of a plurality of coated optical fibers in accordance with pitches of another device such as a fusion splicer. Accordingly, it is not necessary to remove a coating of the optical fibers in the optical fiber holder, and thus it is not necessary to increase a coating removal length more than necessary. The method for connecting optical fibers according to the above configuration can be applied, by the pitch conversion portion including the flat bottom portions and the ridge portions having a height of 0.1 mm or less, and the first lid portion that covers the plurality of optical fibers from above to prevent the plurality of optical fibers from floating, not only to a single-core optical fibers arranged in parallel, but also to a fiber ribbon in which all adjacent optical fibers are coupled in the longitudinal direction and a fiber ribbon with fiber adhesive parts and non-adhesive parts.

DETAILS OF EMBODIMENTS

An optical fiber holder 1 according to an embodiment of the present disclosure will be described below with reference to the drawings. The present disclosure is not limited to these examples, but is indicated by the scope of the claims, and is intended to include all modifications within a range and meaning equivalent to the scope of the claims. A front-rear direction, a left-right direction, and an upper-lower direction in the following description are based on directions of arrows appropriately illustrated in the drawings. In the drawings, a reference sign U indicates an upward direction. A reference sign D indicates a downward direction. A reference sign F indicates a forward direction. A reference sign B indicates a rearward direction. A reference sign L indicates a leftward direction. A reference sign R indicates a rightward direction.

Figure 2:
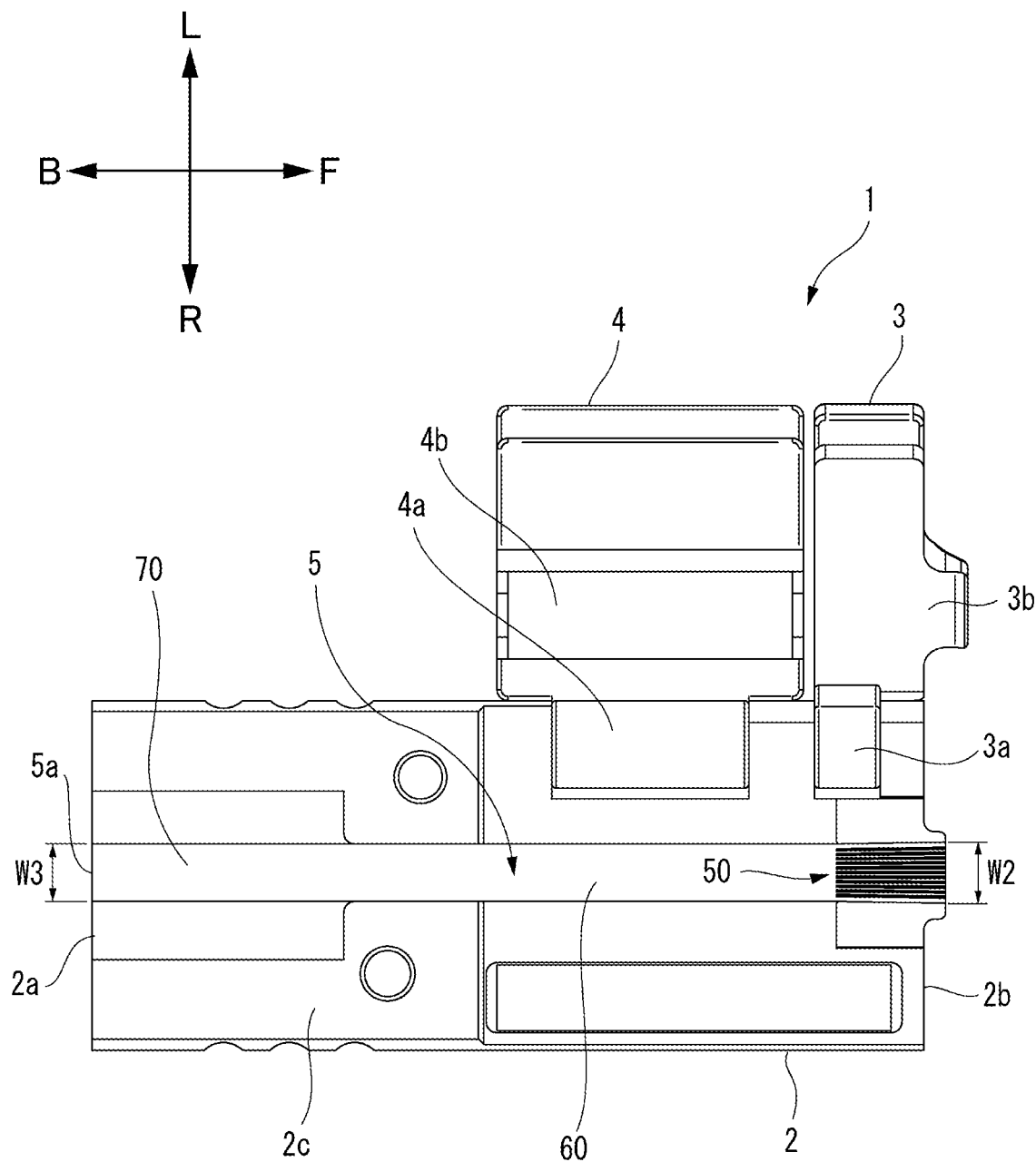
FIG. 2 is a plan view of the optical fiber holder according to the present embodiment.

The optical fiber holder 1 according to the present embodiment will be described with reference to FIGS. 1 to 5. As illustrated in FIGS. 1 and 2, the optical fiber holder 1 includes a holder body 2, a first lid portion 3, and a second lid portion 4. The holder body 2 includes an accommodating portion 5 that can accommodate a plurality of optical fibers (see FIGS. 6 and 7 described later) such as a 12-core optical fiber ribbon in a state in which the plurality of optical fibers are arranged in parallel. The accommodating portion 5 is a groove-shaped concave portion provided on an upper surface 2c of the holder body 2 from one end portion (front end portion 2b) to the other end portion (rear end portion 2a) in a longitudinal direction of the holder body 2.

Figure 3:
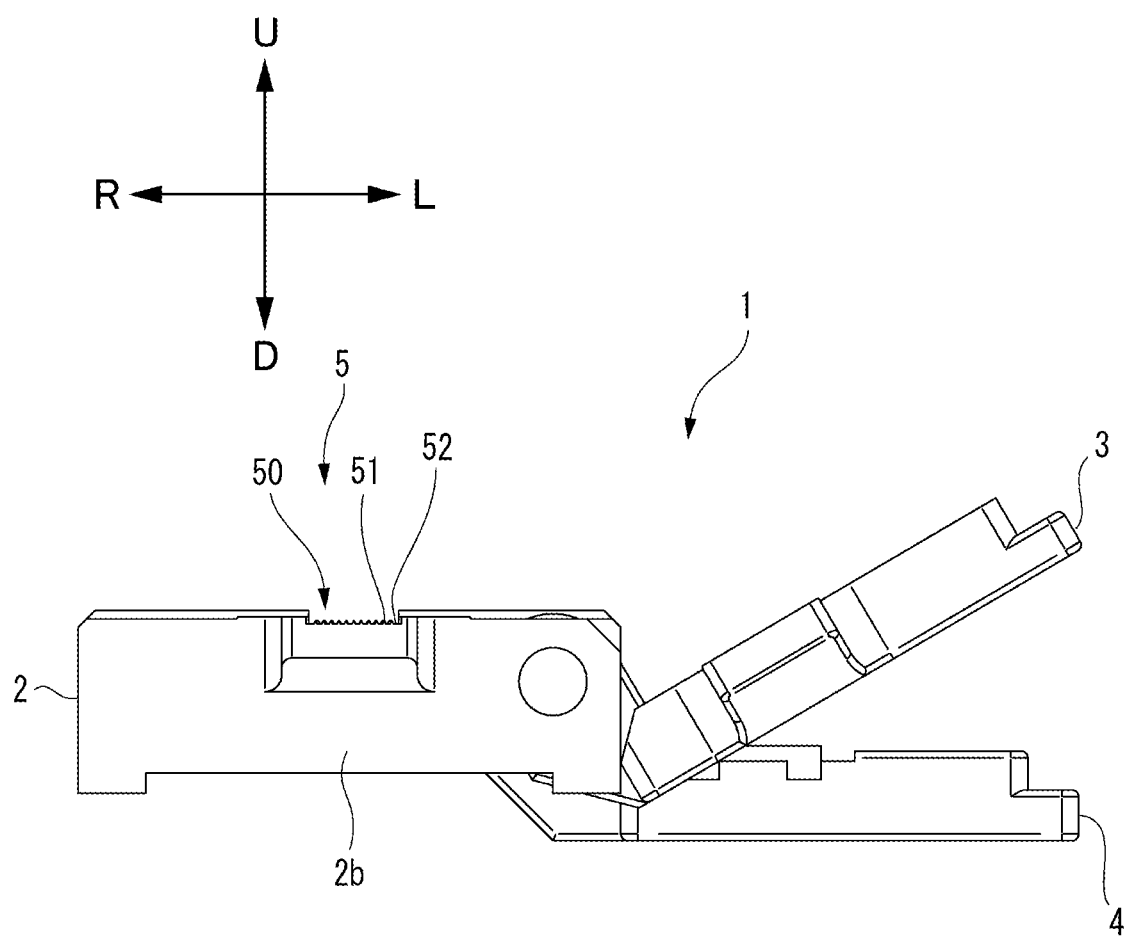
FIG. 3 is a side view of the optical fiber holder according to the present embodiment when viewed from front in an optical fiber insertion direction.

As illustrated in FIGS. 1 to 3, the first lid portion 3 is disposed on a front side of the holder body 2 in the longitudinal direction. The first lid portion 3 is pivotally connected to the holder body 2 via a hinge portion 3a. For this reason, the first lid portion 3 can be opened and closed relative to the holder body 2. A lower surface 3b of the first lid portion 3 is flat.

The second lid portion 4 is disposed at a substantially central portion of the holder body 2 in the longitudinal direction. Accordingly, the second lid portion 4 is disposed behind the first lid portion 3. The second lid portion 4 includes a convex portion 4b at a portion corresponding to the accommodating portion 5. The convex portion 4b is disposed on a lower surface of the second lid portion 4. The second lid portion 4 is pivotally connected to the holder body 2 via a hinge portion 4a. For this reason, the second lid portion 4 can be opened and closed relative to the holder body 2. The hinge portion 3a and the hinge portion 4a are separately pivotal, and accordingly the first lid portion 3 and the second lid portion 4 can be opened and closed individually.

The accommodating portion 5 includes a pitch conversion portion 50, a first flat portion 60, and a second flat portion 70. The pitch conversion portion 50 is disposed in a position where the pitch conversion portion 50 is covered with the first lid portion 3 when the first lid portion 3 of the accommodating portion 5 is closed. That is, the pitch conversion portion 50 is provided at the end portion 2b of the holder body 2. The first flat portion 60 is disposed in a position where the first flat portion 60 is covered with the second lid portion 4 when the second lid portion 4 of the accommodating portion 5 is closed. The second flat portion 70 is disposed in a position where the second flat portion 70 is covered with neither the first lid portion 3 nor the second lid portion 4 of the accommodating portion 5.

Figure 4:
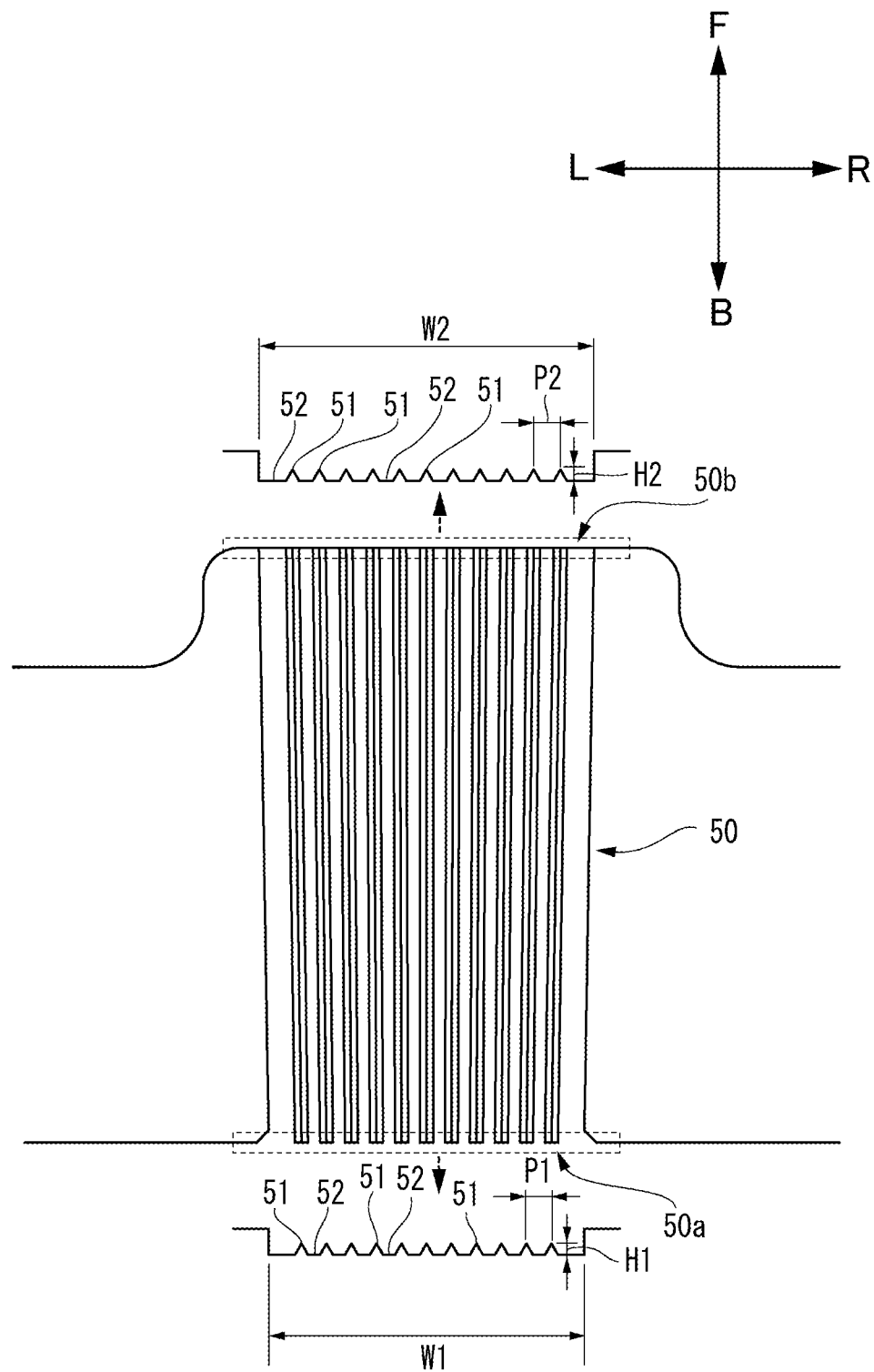
FIG. 4 is a plan view of a pitch conversion portion according to the present embodiment.

As illustrated in FIGS. 3 and 4, the pitch conversion portion 50 includes a plurality of ridge portions 51 arranged in parallel along the longitudinal direction of the holder body 2, and a plurality of bottom portions 52 disposed between the plurality of ridge portions 51. The pitch conversion portion 50 has a length of, for example, 5 mm in the longitudinal direction (front-rear direction in FIG. 4). Of a length of the pitch conversion portion 50 in a transverse direction (left-right direction in FIG. 4), the length of the pitch conversion portion 50 at a front end portion is, for example, 2.8 mm. Of the length of the pitch conversion portion 50 in the transverse direction, the length of the pitch conversion portion 50 at a rear end portion is, for example, 2.6 mm. In the present embodiment, the optical fiber holder 1 includes 11 ridge portions 51 and 12 bottom portions 52.

The ridge portion 51 has an upward convex triangular shape in a cross-sectional view orthogonal to the longitudinal direction of the holder body 2. The ridge portion 51 extends from the rear end portion to the front end portion of the pitch conversion portion 50. The ridge portion 51 at a rear end portion 50a of the ridge portion 51 (rear end portion of the pitch conversion portion 50) has a height H1 equal to a height H2 of the ridge portion 51 at a front end portion 50b of the ridge portion 51 (front end portion of the pitch conversion portion 50). The ridge portion 51 at a portion other than the rear end portion 50a and the front end portion 50b also has a height equal to the height H1 of the ridge portion 51 at the rear end portion 50a and the height H2 of the ridge portion 51 at the front end portion 50b. That is, the ridge portion 51 has a uniform height. Here, "uniform" means that a smallest height of the height of the ridge portion 51 falls within a range of 50% of a largest height of the height of the ridge portion 51. The height of the ridge portion 51 is preferably 0.07 mm or more and 0.1 mm or less, and in the present embodiment, the height of the ridge portion 51 is 0.1 mm.

The ridge portions 51 have pitches that gradually and continuously enlarge from the rear end portion 50a toward the front end portion 50b. That is, the ridge portions 51 are provided such that parallel intervals in between continuously enlarges from the rear end portion 50a to the front end portion 50b. A pitch P1 between the adjacent ridge portions 51 at the rear end portions 50a of the ridge portions 51 is smaller than a pitch P2 between the adjacent ridge portions 51 at the front end portions 50b of the ridge portions 51. The pitch P1 of the ridge portions 51 at the rear end portions 50a is 210 µm. The pitch P2 of the ridge portions 51 at the front end portions 50b is 225 µm. An entire width W1 of the ridge portions 51 at the rear end portions 50a is 2.5 mm. An entire width W2 of the ridge portions 51 at the front end portions 50b is 2.67 mm.

The bottom portion 52 is flat. The bottom portion 52 is located below a top portion of the ridge portion 51.

As illustrated in FIG. 2, the first flat portion 60 and the second flat portion 70 are grooves extending in the longitudinal direction of the holder body 2. The second flat portion 70 is located behind the first flat portion 60. The first flat portion 60 has a width (length in the left-right direction) equal to a width of the second flat portion 70. An entire width W3 of the accommodating portion 5 at a rear end portion 5a is 2.5 mm. That is, the width of the first flat portion 60 and the width of the second flat portion 70 are 2.5 mm. The width of the first flat portion 60 and the width of the second flat portion 70 are equal to the entire width W1 of the ridge portion 51 at the rear end portion 50a.

Figure 5:
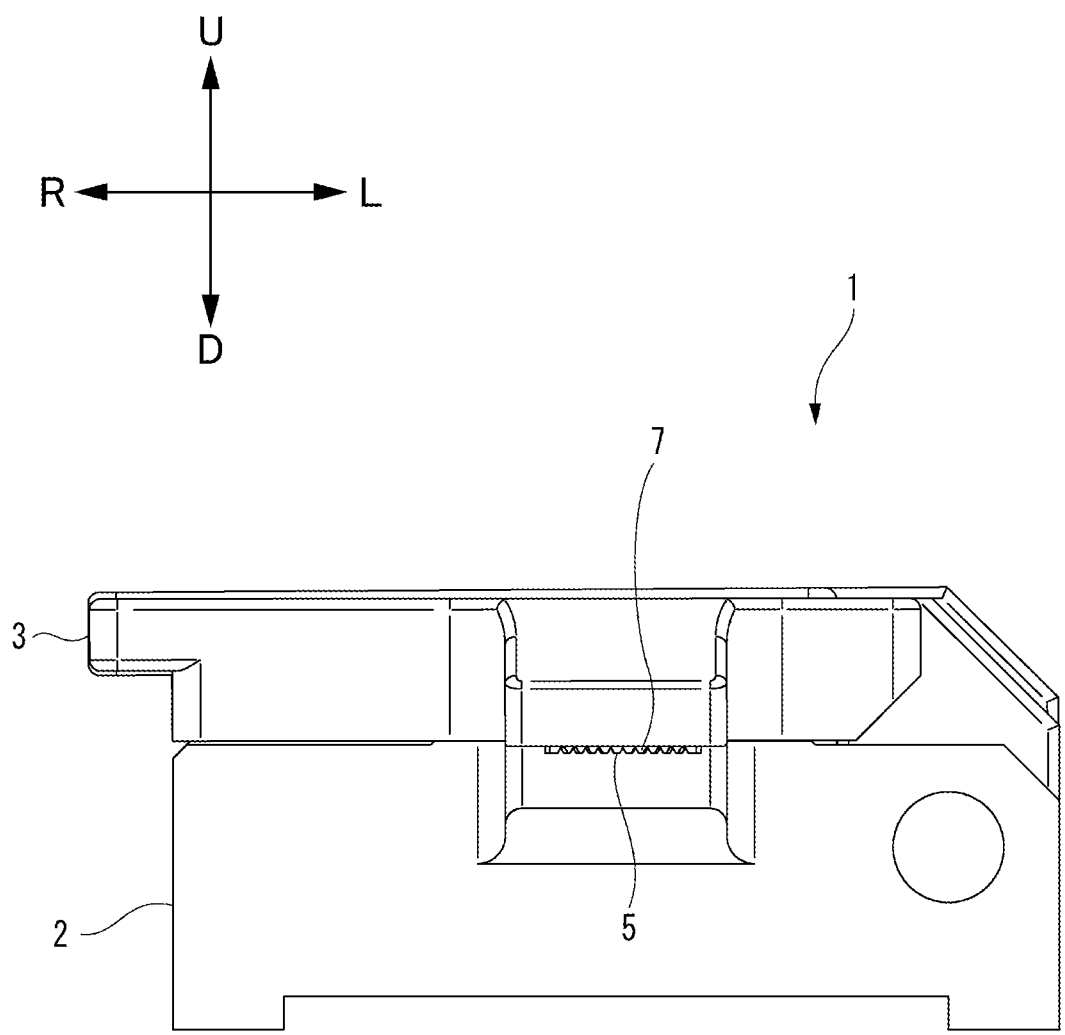
FIG. 5 is a side view of the optical fiber holder according to the present embodiment when viewed from front in the optical fiber insertion direction in a state in which a first lid portion and a second lid portion of the optical fiber holder are closed relative to the holder body.

As illustrated in FIG. 5, in a state in which the first lid portion 3 is closed relative to the holder body 2, a gap 7 extending over an entire width of the pitch conversion portion 50 is defined between the first lid portion 3 and the pitch conversion portion 50. The gap 7 (upper-lower interval between the bottom portion 52 of the accommodating portion 5 and the lower surface 3b of the first lid portion 3, see FIG. 7) has a height H3 larger than an outer diameter of an optical fiber to be inserted, and is small to such an extent that optical fibers do not overlap in the upper-lower direction. The outer diameter of the optical fiber to be inserted into the optical fiber holder 1 is, for example, 180 µm to 200 µm. Accordingly, the height H3 of the gap 7 is preferably 220 µm or more and 250 µm or less.

The first lid portion 3 prevents a plurality of optical fibers accommodated in the gap 7 from floating. In the state in which the first lid portion 3 is closed relative to the holder body 2, the first lid portion 3 may or may not be in contact with the plurality of optical fibers.

In a state in which the second lid portion 4 is closed relative to the holder body 2, the second lid portion 4 holds the plurality of optical fibers in the accommodating portion 5 by pressing the plurality of optical fibers with the convex portion 4b. Accordingly, displacement in an axial direction of the plurality of optical fibers accommodated in the gap 7 is prevented by the second lid portion 4. For this reason, the first lid portion 3 does not necessarily press the plurality of optical fibers accommodated in the gap 7.

Method for Using Optical Fiber Holder According to Present Embodiment

Next, an example of a method for using the optical fiber holder 1 according to the present embodiment will be described with reference to FIGS. 1 to 7.

Figure 6:
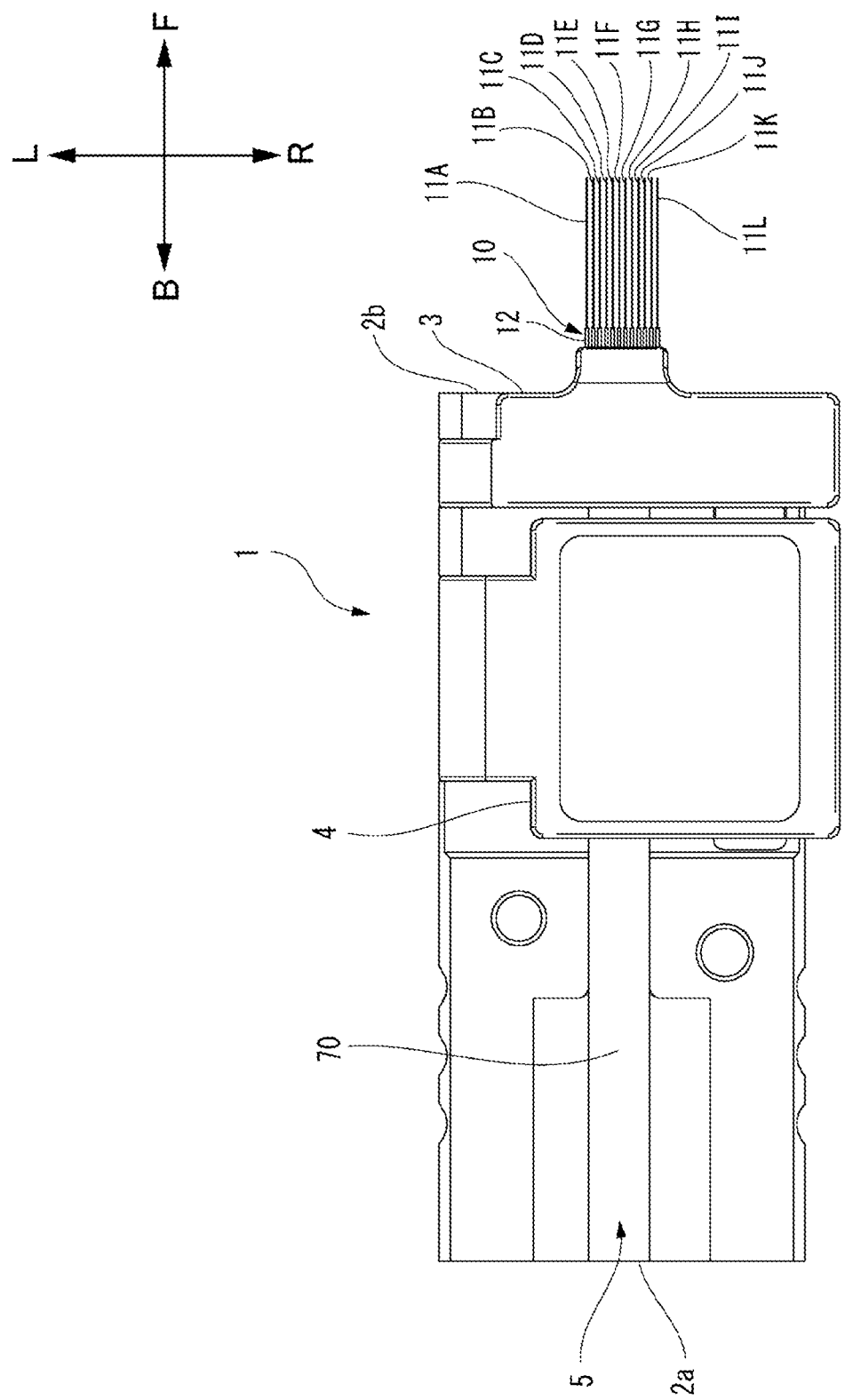
FIG. 6 is a plan view illustrating the state in which the first lid portion and the second lid portion of the optical fiber holder according to the present embodiment are closed relative to the holder body.
Figure 7:
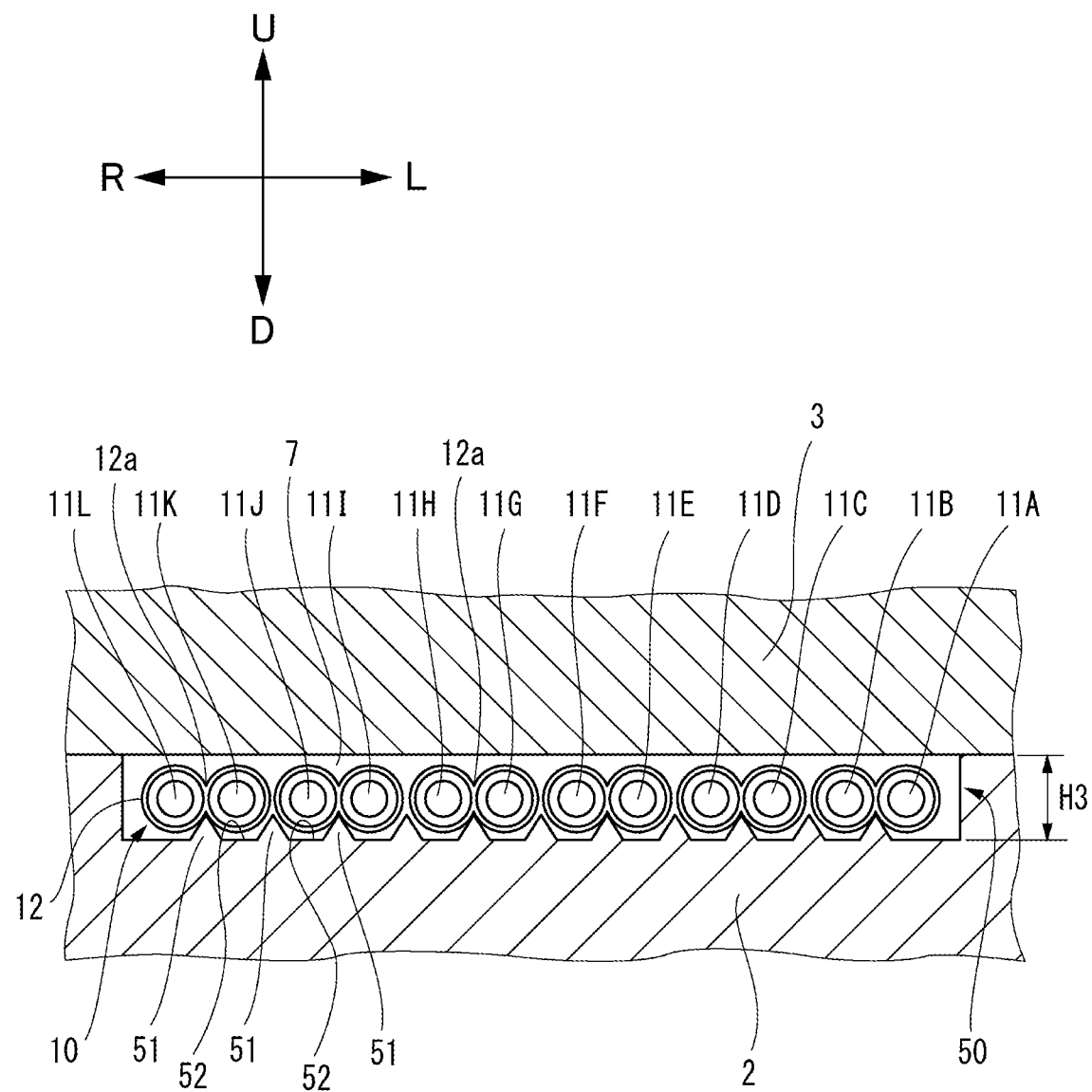
FIG. 7 is a schematic view illustrating an example of positions of optical fibers at an end portion of the pitch conversion portion.

A plurality of optical fibers used in the example are an optical fiber ribbon 10 with fiber adhesive parts and non-adhesive parts. The optical fiber ribbon 10 with fiber adhesive parts and non-adhesive parts is an optical fiber ribbon in which, in a state in which the plurality of optical fibers are arranged in parallel, the adhesive parts in which adjacent optical fibers adhere to each other and the non-adhesive parts in which adjacent optical fibers do not adhere to each other are intermittently provided in a longitudinal direction. The adhesive parts and the non-adhesive parts are intermittently provided for each two cores. The adhesive parts and the non-adhesive parts may be provided intermittently for each core or for each multiple cores. As illustrated in FIGS. 6 and 7, the optical fiber ribbon 10 with fiber adhesive parts and non-adhesive parts is a 12-core optical fiber ribbon including a plurality of optical fibers 11A to 11L. In the optical fiber ribbon 10 with fiber adhesive parts and non-adhesive parts, a tape resin 12 thinly cover an entire circumference of the plurality of optical fibers 11A to 11L. The tape resin 12 may be provided only between adjacent optical fibers at the adhesive parts. The tape resin 12 may be, for example, an ultraviolet curable resin. As an example, an outer diameter of the optical fibers 11A to 11L in the optical fiber ribbon 10 with fiber adhesive parts and non-adhesive parts is 200 μm, and a parallel pitch that is a center-to-center distance between the optical fibers is 200 μm.

In the optical fiber holder 1, as illustrated in FIGS. 1 to 3, the first lid portion 3 and the second lid portion 4 are opened relative to the holder body 2. The optical fiber ribbon 10 with fiber adhesive parts and non-adhesive parts is placed from above in the accommodating portion 5 of the optical fiber holder 1 in the state illustrated in FIGS. 1 to 3. At this time, a length by which the optical fiber ribbon 10 with fiber adhesive parts and non-adhesive parts protrudes forward from the optical fiber holder 1 is adjusted to be an appropriate length when the holder is set in a fusion splicer (example of another device). The protruding length is, for example, 5 mm or more.

Of the optical fiber ribbon 10 with fiber adhesive parts and non-adhesive parts placed in the accommodating portion 5, a part placed in the pitch conversion portion 50 has pitches of optical fibers converted (widened in this example) by the ridge portions 51.

An operator visually confirms that the optical fiber ribbon 10 with fiber adhesive parts and non-adhesive parts is properly placed in the pitch conversion portion 50. The operator confirms that the optical fiber ribbon 10 with fiber adhesive parts and non-adhesive parts is properly placed in the pitch conversion portion 50, and closes the first lid portion 3 relative to the holder body 2.

Accordingly, the optical fiber ribbon 10 with fiber adhesive parts and non-adhesive parts accommodated in the pitch conversion portion 50 is prevented from floating, and the optical fiber ribbon 10 with fiber adhesive parts and non-adhesive parts is accommodated in the gap 7 as illustrated in FIG. 7. In addition, the pitches of the part of the optical fiber ribbon 10 with fiber adhesive parts and non-adhesive parts that is accommodated in the pitch conversion portion 50 are converted.

In the pitch conversion portion 50, the pitches of the optical fiber ribbon 10 with fiber adhesive parts and non-adhesive parts are converted by appropriately bringing the optical fibers 11A to 11L into contact with top portions and inclined surfaces of the ridge portions 51. In particular, in the non-adhesive parts, pitches are changed in accordance with the pitches of the ridge portions 51. At the rear end portions 50a of the ridge portions 51, an average pitch of the 12-core optical fibers 11A to 11L is substantially equal to the pitch P1 (210 μm) of the ridge portions 51. At the front end portions 50b of the ridge portions 51, an average pitch of the 12-core optical fibers 11A to 11L is substantially equal to the pitch P2 (225 μm) of the ridge portions 51. At this time, adhesive parts 12a of the tape resin 12 between the optical fibers of the optical fiber ribbon 10 with fiber adhesive parts and non-adhesive parts are placed on the top portions of the ridge portions 51, and the optical fibers 11A to 11L slightly float from the bottom portions 52 of the accommodating portion 5. Since the height of the ridge portions 51 is 0.1 mm or less, the optical fibers 11A to 11L do not greatly float from the bottom portions 52, but slightly float or come into contact with the bottom portion 52. Also in the adhesive parts 12a of the optical fiber ribbon 10 with fiber adhesive parts and non-adhesive parts, due to the contact with the ridge portions 51, a force acts to widen an interval between adjacent optical fibers. Since the ridge portions 51 linearly extend from the rear end portions 50a to the front end portions 50b and the pitches are continuously enlarged in the longitudinal direction, the force to widen the interval between optical fibers is transmitted even to the part of the optical fiber ribbon 10 with fiber adhesive parts and non-adhesive parts that protrudes forward from the pitch conversion portion 50.

Next, the operator closes the second lid portion 4 relative to the holder body 2. Accordingly, the optical fiber ribbon 10 with fiber adhesive parts and non-adhesive parts is held by the convex portion 4b of the second lid portion 4 and the accommodating portion 5.

After the second lid portion 4 is closed relative to the holder body 2, the operator removes the tape resin 12 on a distal end side of the optical fiber ribbon 10 with fiber adhesive parts and non-adhesive parts and a coating layer of the optical fibers 11A to 11L to expose glass fibers of the optical fibers 11A to 11L by a predetermined length. The predetermined length is set to be a length that enables fusion splicing by a fusion splicer or the like. Since each of the optical fibers 11A to 11L is a single core optical fiber, pitches of the glass fibers are further enlarged (for example, an average pitch is about 240 μm) than the pitches at the front end portions 50b by the force to widen the interval between optical fibers at the pitch conversion portion 50.

In this state, the operator sets the optical fiber holder 1 in a predetermined position of the fusion splicer. The optical fiber holder 1 is disposed such that the end portion 2b of the holder body 2 is located in a position about 4 mm to 5 mm away from V-grooves of the fusion splicer. The glass fibers of the 12 optical fibers 11A to 11L arranged in parallel are disposed in respective V-grooves of the fusion splicer. A width of each of the V-grooves of the fusion splicer is, for example, 0.255 mm, and a total pitch width of 12 V-grooves is 2.805 mm (0.255 mm×11). By using the optical fiber holder 1, even for the optical fiber ribbon 10 with fiber adhesive parts and non-adhesive parts having a pitch of 200 μm, optical fibers can be appropriately placed in accordance with the V-grooves of the fusion splicer. The pitches of the glass fibers placed in the V-grooves of the fusion splicer are 255 μm. When the fusion splicer is operated in this state, the optical fibers 11A to 11L can be fused to another plurality of optical fibers.

As described above, since there is a predetermined distance from an end portion of an optical fiber holder to the V-grooves of the fusion splicer or the like, pitches of optical fibers in the optical fiber holder may not be substantially the same as pitches of the V-grooves. When the width of the V-grooves of the fusion splicer or the like is 2.805 mm and a distance between centers of two outermost optical fibers among a plurality of optical fibers arranged in parallel in the V-grooves (hereinafter, referred to as a total pitch width of the plurality of optical fibers) is 2.605 mm to 2.870 mm, all the optical fibers can be appropriately placed in the V-grooves. Based on such knowledge, when an optical fiber ribbon with fiber adhesive parts and non-adhesive parts for each two cores is used in the optical fiber holder 1, the pitch of the ridge portions 51 at the rear end portions 50a is set to be 210 μm, and the pitch of the ridge portions 51 at the front end portions 50b is set to be 225 μm, so that a total pitch width of a plurality of optical fibers in the position of the V-grooves of the fusion splicer or the like can be set to be 2.605 mm to 2.870 mm. As an example, when the optical fiber ribbon 10 with fiber adhesive parts and non-adhesive parts for each two cores that includes 12 optical fibers having an outer diameter of 200 μm is used, the total pitch width of the plurality of optical fibers in the position of the V-grooves of the fusion splicer or the like is set to be 2.620 mm.

According to the optical fiber holder 1, pitches of the optical fiber ribbon 10 with fiber adhesive parts and non-adhesive parts can be changed in accordance with pitches of a device such as a fusion splicer by the pitch conversion portion 50 including the ridge portion 51 having a height of 0.1 mm or less and the flat bottom portion 52. Accordingly, it is not necessary to remove a coating of the optical fiber ribbon 10 with fiber adhesive parts and non-adhesive parts in the optical fiber holder 1, and thus it is not necessary to increase a coating removal length more than necessary. In addition, the optical fiber holder 1 can be applied not only to single optical fibers arranged in parallel but also to the optical fiber ribbon 10 with fiber adhesive parts and non-adhesive parts by the pitch conversion portion 50 and the first lid portion 3 that covers the plurality of optical fibers 11A to 11L from above to prevent the plurality of optical fibers 11A to 11L from floating.

According to the optical fiber holder 1, since the pitch conversion portion 50 is provided at one end portion of the accommodating portion 5 in the longitudinal direction, the pitches of the optical fibers 11A to 11L protruding from the optical fiber holder 1 can be continuously changed while changing the pitches of the optical fibers 11A to 11L at the front end portion 2b of the holder body 2.

In the example described above, the ridge portion 51 extends until the front end portion of the holder body 2. Alternatively, the ridge portion 51 may not extend until the front end portion of the holder body 2. The interval between the optical fibers protruding from the front end portion of the optical fiber holder 1 may be a predetermined interval. Further, although all of the ridge portions 51 continuously extend in the front-rear direction of the holder body 2, the ridge portions 51 may be provided intermittently in the front-rear direction such that a parallel interval enlarges or lessens from a rear end side toward a front end side. In this case, for example, when the ridge portions are provided in the front-rear direction at an interval smaller than a length of an adhesive part of an optical fiber ribbon with fiber adhesive parts and non-adhesive parts in the longitudinal direction, the pitches of the optical fiber ribbon can be changed as in the above-described example.

When the pitches of the optical fiber ribbon in the holder are enlarged to the same value as the pitches of the V-grooves of the fusion splicer or the like, it is conceivable to hold a part obtained by separating the optical fiber ribbon into single-core glass fibers in the holder. However, in this case, the length of the glass fibers may be larger than necessary. According to the optical fiber holder 1, since it is not necessary to separate the optical fiber ribbon 10 with fiber adhesive parts and non-adhesive parts into single cores in the optical fiber holder 1, a coating end portion of the optical fiber ribbon can sufficiently reach the inside of a protective sleeve without increasing a coating removal length more than necessary.

According to the optical fiber holder 1, since the optical fibers 11A to 11L can be held by the second lid portion 4, the first lid portion 3 does not necessarily press the optical fibers 11A to 11L. For this reason, according to the optical fiber holder 1, the optical fibers 11A to 11L are less likely to be damaged.

According to the optical fiber holder 1, the first lid portion 3 can be prevented from pressing the optical fibers 11A to 11L sandwiched between the first lid portion 3 and the bottom portion 52. According to the optical fiber holder 1, the optical fibers 11A to 11L easily move in a parallel direction on the flat bottom portion 52 since the optical fibers 11A to 11L are not pressed, and the pitches can be changed without applying an unnecessary external force to the optical fibers 11A to 11L.

Although the present disclosure is described in detail with reference to a specific embodiment, it is apparent to those skilled in the art that various changes and modifications can be made without departing from the spirit and scope of the present disclosure. The numbers, positions, shapes, and the like of constituent members described above are not limited to those in the above-described embodiment, and can be changed to numbers, positions, shapes, and the like suitable for carrying out the present disclosure.

In the above embodiment, the optical fiber holder 1 includes the holder body 2, the first lid portion 3, and the second lid portion 4. Alternatively, the optical fiber holder 1 may not include the second lid portion 4. In this case, the first lid portion 3 may cover the pitch conversion portion 50 and the first flat portion 60, and may be cover the pitch conversion portion 50, the first flat portion 60, and the second flat portion 70. In this case, the first flat portion 60 or the first flat portion 60 and the second flat portion 70 may be provided with a plurality of ridge portions having the same configuration as the ridge portions 51 (however, the pitches are constant) and a plurality of bottom portions having the same configuration as the bottom portions 52.

In the above embodiment, the optical fiber ribbon 10 with fiber adhesive parts and non-adhesive parts is described, and the present disclosure is not limited thereto. An optical fiber ribbon used in the optical fiber holder 1 may be, for example, an optical fiber ribbon without fiber adhesive parts and non-adhesive parts in which a plurality of optical fibers are arranged in parallel in a direction orthogonal to respective longitudinal directions and are collectively covered with a tape resin. Optical fibers used in the optical fiber holder 1 may be, for example, a plurality of single-core optical fibers arranged in parallel.

In the above embodiment, the first lid portion 3 covers the pitch conversion portion 50 when the first lid portion 3 is closed. Alternatively, the first lid portion 3 may cover only a part of the pitch conversion portion 50.

The pitches of the ridge portions 51 may be provided such that the parallel interval gradually decreases from the rear end portion 50a toward the front end portion 50b.

REFERENCE SIGNS LIST

1: optical fiber holder
2: holder body

2a: end portion
2b: end portion
2c: upper surface
3: first lid portion
3a: hinge portion
3b: lower surface
4: second lid portion
4a: hinge portion
4b: convex portion
5: accommodating portion
5a: rear end portion
7: gap
10: optical fiber ribbon with fiber adhesive parts and non-adhesive parts
11A to 11L: optical fiber
12: tape resin
12a: adhesive part
50: pitch conversion portion
50a: rear end portion
50b: front end portion
51: ridge portion
52: bottom portion
60: first flat portion
70: second flat portion

What is claimed is:

1. An optical fiber holder comprising:
a holder body including an accommodating portion, the accommodating portion being configured to accommodate a plurality of optical fibers in a state in which the plurality of optical fibers are arranged in parallel; and
a first lid portion configured to be opened and closed relative to the holder body and cover at least a part of the accommodating portion, wherein
the accommodating portion includes a pitch conversion portion having a plurality of ridge portions arranged in parallel and a plurality of flat bottom portions between the plurality of ridge portions, and
the plurality of ridge portions have a uniform height of 0.1 mm or less from the bottom portions, and parallel intervals in between enlarge or lessen from one side toward the other side in a longitudinal direction, wherein
the pitch conversion portion is provided at one end portion of the accommodating portion in the longitudinal direction, and
the first lid portion is configured to cover at least a part of the pitch conversion portion, wherein
the optical fiber holder further comprises a second lid portion configured to be opened and closed relative to the holder body, cover a region of the accommodating portion that is different from the pitch conversion portion in a state of being closed relative to the holder body, and hold the optical fibers accommodated in the accommodating portion, wherein
the first lid portion does not press the optical fibers, and the second lid portion presses the optical fibers.

2. The optical fiber holder according to claim 1, wherein a gap from the bottom portions to the first lid portion has a height of 220 μm or more and 250 μm or less in a state in which the first lid portion is closed relative to the holder body.

3. A method for connecting optical fibers using the optical fiber holder according to claim 1, the method comprising:
placing the plurality of optical fibers in the pitch conversion portion, converting pitches of the plurality of optical fibers placed in the pitch conversion portion into pitches of another device different from the optical fiber holder by the plurality of ridge portions, and accommodating the plurality of optical fibers in the accommodating portion; and
connecting the plurality of optical fibers subjected to pitch conversion to other optical fibers that are disposed in the other device and are different from the plurality of optical fibers.

4. An optical fiber holder comprising:
a holder body including an accommodating portion, the accommodating portion being configured to accommodate a plurality of optical fibers in a state in which the plurality of optical fibers are arranged in parallel; and
a first lid portion configured to be opened and closed relative to the holder body and cover at least a part of the accommodating portion, wherein
the accommodating portion includes a pitch conversion portion having a plurality of ridge portions arranged in parallel and a plurality of flat bottom portions between the plurality of ridge portions, and
the plurality of ridge portions have a uniform height of 0.1 mm or less from the bottom portions, and parallel intervals in between enlarge or lessen from one side toward the other side in a longitudinal direction, wherein
the optical fiber holder further comprises a second lid portion configured to be opened and closed relative to the holder body, cover a region of the accommodating portion that is different from the pitch conversion portion in a state of being closed relative to the holder body, and hold the optical fibers accommodated in the accommodating portion, wherein
the accommodating portion further includes a first flat portion, and a second flat portion, the first flat portion is disposed in a position where the first flat portion is covered with the second lid portion when the second lid portion is closed, and the second flat portion is disposed in a position where the second flat portion is covered with neither the first lid portion nor the second lid portion.

* * * * *